(12) United States Patent
Schmidt

(10) Patent No.: US 9,620,148 B2
(45) Date of Patent: Apr. 11, 2017

(54) SYSTEMS, VEHICLES, AND METHODS FOR LIMITING SPEECH-BASED ACCESS TO AN AUDIO METADATA DATABASE

(71) Applicant: Toyota Motor Engineering & Manufacturing North America, Inc., Erlanger, KY (US)

(72) Inventor: Eric Randell Schmidt, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 439 days.

(21) Appl. No.: 13/932,264

(22) Filed: Jul. 1, 2013

(65) Prior Publication Data
US 2015/0006165 A1    Jan. 1, 2015

(51) Int. Cl.
*G10L 25/54* (2013.01)
*G10L 15/28* (2013.01)

(52) U.S. Cl.
CPC ........... *G10L 25/54* (2013.01); *G10L 15/285* (2013.01)

(58) Field of Classification Search
CPC .......... G10L 15/285; G10L 15/193; G10L 2015/223; G06F 12/00; G06F 17/30752
USPC .......... 704/251, 275; 711/171, 172; 725/45; 707/662
See application file for complete search history.

(56) References Cited

U.S. PATENT DOCUMENTS

| | | | |
|---|---|---|---|
| 6,658,414 B2 | 12/2003 | Bryan et al. | |
| 6,973,429 B2 * | 12/2005 | Smith | G10L 15/193 704/245 |
| 7,324,945 B2 * | 1/2008 | Butzberger | G10L 15/285 704/257 |
| 7,574,579 B2 * | 8/2009 | Gladwin | G06F 21/6227 711/114 |
| 7,962,937 B2 * | 6/2011 | Cho et al. | 725/44 |
| 7,983,915 B2 | 7/2011 | Knight et al. | |
| 8,438,485 B2 | 5/2013 | Kulis et al. | |
| 8,856,484 B2 * | 10/2014 | Ben-Tsion | G06F 3/0605 711/171 |
| 9,465,823 B2 * | 10/2016 | Shergill | G06F 17/30303 |
| 2003/0004722 A1 * | 1/2003 | Butzberger | G10L 15/285 704/257 |
| 2003/0206713 A1 * | 11/2003 | Adolph | G11B 20/10 386/241 |
| 2005/0193092 A1 * | 9/2005 | Habermas | 709/219 |
| 2007/0137463 A1 * | 6/2007 | Lumsden | 84/603 |
| 2007/0198273 A1 * | 8/2007 | Hennecke | 704/277 |
| 2008/0162716 A1 * | 7/2008 | Kayanuma | G06F 12/0802 711/118 |
| 2009/0076821 A1 * | 3/2009 | Brenner | G06F 17/30053 704/260 |

(Continued)

*Primary Examiner* — Martin Lerner
(74) *Attorney, Agent, or Firm* — Dinsmore & Shohl LLP

(57) ABSTRACT

Systems, vehicles, and methods for limiting speech-based access to an audio metadata database are described herein. Audio metadata databases described herein include a plurality of audio metadata entries. Each audio metadata entry includes metadata information associated with at least one audio file. Embodiments described herein determine when a size of the audio metadata database reaches a threshold size, and limit which of the plurality of audio metadata entries may be accessed in response to the speech input signal when the size of the audio metadata database reaches the threshold size.

22 Claims, 3 Drawing Sheets

(56) References Cited

U.S. PATENT DOCUMENTS

| | | | |
|---|---|---|---|
| 2010/0169595 A1* | 7/2010 | Bryant-Rich | G06F 11/1458 711/162 |
| 2011/0004473 A1 | 1/2011 | Laperdon et al. | |
| 2011/0119233 A1* | 5/2011 | Reddy | H01L 21/31116 707/624 |
| 2011/0218983 A1* | 9/2011 | Chaney | G06F 17/30752 707/705 |
| 2012/0036164 A1* | 2/2012 | Jahan | H04N 21/23406 707/803 |
| 2012/0110036 A1* | 5/2012 | Rabii | 707/822 |
| 2012/0266162 A1* | 10/2012 | Baron | G06F 9/45558 718/1 |
| 2013/0246704 A1* | 9/2013 | Kotzur | G06F 11/1076 711/114 |
| 2013/0326166 A1* | 12/2013 | Desai | G06F 9/5016 711/158 |
| 2014/0052953 A1* | 2/2014 | Ben-Tsion et al. | 711/172 |

\* cited by examiner

SYSTEMS, VEHICLES, AND METHODS FOR LIMITING SPEECH-BASED ACCESS TO AN AUDIO METADATA DATABASE

TECHNICAL FIELD

Embodiments described herein generally relate to speech recognition systems and, more specifically, to systems, vehicles, and methods for limiting speech-based access to an audio metadata database.

BACKGROUND

By way of background, speech recognition systems may facilitate speech-based access to audio collection including a number of audio files. The audio files may be stored among a variety of devices (e.g., mobile devices, flash sticks, CDs, DVDs, hard drives, etc.). The audio files may be indexed (e.g., using an audio metadata database including song name, album name, artist name, etc.) by the speech recognition system to allow a user to search for and play a desired audio file based on spoken commands received by the speech recognition system. As the number of indexed audio files grows, the amount of memory needed by the speech recognition system may increase, latency may increase, and recognition accuracy may decrease.

Accordingly, a need exists for systems, vehicles, and methods for limiting speech-based access to an audio metadata database.

SUMMARY

In one embodiment, a speech recognition system includes one or more processors, a microphone communicatively coupled to the one or more processors, one or more memory modules communicatively coupled to the one or more processors, an audio metadata database stored in the one or more memory modules, and machine readable instructions stored in the one or more memory modules. The microphone receives acoustic vibrations. The audio metadata database includes a plurality of audio metadata entries. Each audio metadata entry includes metadata information associated with at least one audio file. When executed by the one or more processors, the machine readable instructions cause the speech recognition system to transform the acoustic vibrations received by the microphone into a speech input signal, determine when a size of the audio metadata database reaches a threshold size, and limit which of the plurality of audio metadata entries may be accessed in response to the speech input signal when the size of the audio metadata database reaches the threshold size.

In another embodiment, a vehicle includes one or more processors, a microphone communicatively coupled to the one or more processors, one or more memory modules communicatively coupled to the one or more processors, an audio metadata database stored in the one or more memory modules, and machine readable instructions stored in the one or more memory modules. The microphone receives acoustic vibrations. The audio metadata database includes a plurality of audio metadata entries. Each audio metadata entry includes metadata information associated with at least one audio file. When executed by the one or more processors, the machine readable instructions cause the vehicle to transform the acoustic vibrations received by the microphone into a speech input signal, determine when a size of the audio metadata database reaches a threshold size, and limit which of the plurality of audio metadata entries may be accessed in response to the speech input signal when the size of the audio metadata database reaches the threshold size.

In yet another embodiment, a method for limiting access to an audio metadata database stored in one or more memory modules includes receiving, automatically by a processor a speech input signal. The audio metadata database includes a plurality of audio metadata entries. Each audio metadata entry includes metadata information associated with at least one audio file. The method further includes determining when a size of the audio metadata database reaches a threshold size, and limiting which of the plurality of audio metadata entries may be accessed in response to the speech input signal when the size of the audio metadata database reaches the threshold size.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include systems and vehicles for limiting speech-based access to an audio metadata database. Referring generally to the figures, embodiments of the systems and vehicles provided herein determine when a size of an audio metadata database reaches a threshold size and limit which of a plurality of audio metadata entries may be accessed in response to a speech input signal when the size of the audio metadata database reaches the threshold size. Such limitation of accessible audio metadata entries may reduce memory requirements for the audio metadata database and/or the speech recognition grammars associated with the audio metadata entries that are no longer accessible, thereby enhancing system performance and reducing latency, as will be described in further detail herein. The various systems, vehicles, and methods for limiting speech-based access to an audio metadata database will be described in more detail herein with specific reference to the corresponding drawings.

Figure 1:
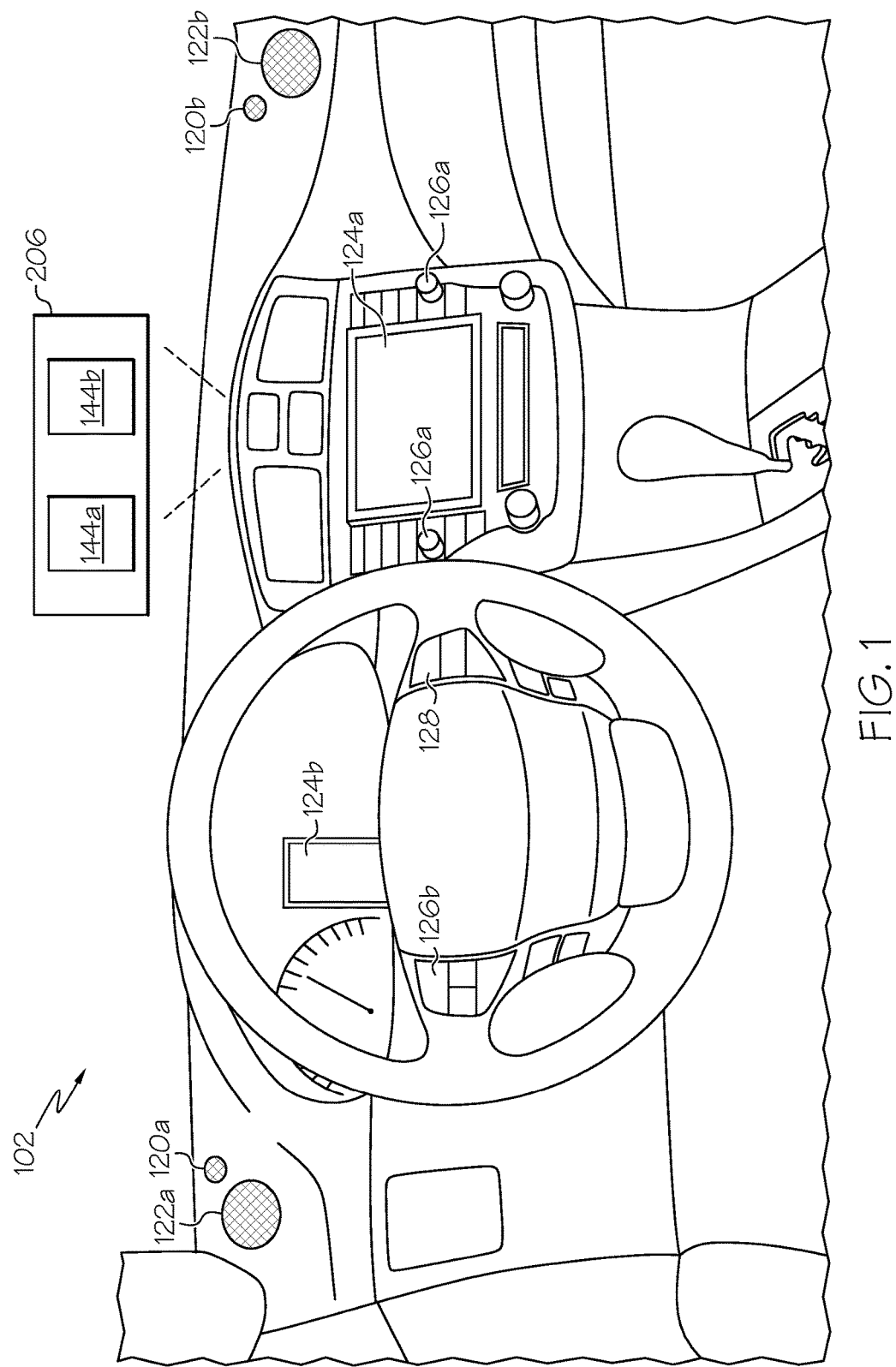
FIG. 1 schematically depicts an interior portion of a vehicle for reducing the size of recognizable audio metadata indexes, according to one or more embodiments shown and described herein.

Referring now to the drawings, FIG. 1 schematically depicts an interior portion of a vehicle 102, according to embodiments disclosed herein. As illustrated, the vehicle 102 may include a number of components that may provide input to or output from the speech recognition systems described herein. The interior portion of the vehicle 102 includes a console display 124a and a dash display 124b (referred to independently and/or collectively herein as "display 124"). The console display 124a may be configured to provide one or more user interfaces and may be configured as a touch screen and/or include other features for receiving user input. The dash display 124b may similarly be configured to provide one or more interfaces, but often the data provided in the dash display 124b is a subset of the data provided by the console display 124a. The vehicle 102 also includes one or more microphones 120a, 120b (referred to independently and/or collectively herein as "microphone 120") and one or more speakers 122a, 122b (referred to independently and/or collectively herein as "speaker 122"). The one or more microphones 120a, 120b may be configured for receiving user voice commands and/or other inputs to the speech recognition systems described herein. Similarly, the speakers 122a, 122b may be utilized for providing audio content from the speech recognition system to the user. The microphone 120, the speaker 122, and/or related components may be part of an in-vehicle audio system. The vehicle 102 also includes tactile input hardware 126a and/or peripheral tactile input 126b for receiving tactile user input, as will be described in further detail below. The vehicle 102 also includes an activation switch 128 for providing an activation input to the speech recognition system, as will be described in further detail below.

The vehicle 102 may also include one or more memory modules 206, which may store an audio metadata database 144a and audio metadata database limitation logic 144b. The audio metadata database 144a includes a plurality of audio metadata entries, each of which includes metadata information associated with a corresponding audio file, as will be described in further detail below. The audio metadata database limitation logic 144b may include a plurality of different pieces of logic, each of which may be embodied as a computer program, firmware, and/or hardware, as an example. The audio metadata database limitation logic 144b may be configured to determine when a size of the audio metadata database 144a reaches a threshold size, and limit which of the plurality of audio metadata entries may be accessed in response to a speech input signal when the size of the audio metadata database 144a reaches the threshold size, as will be described in further detail below.

Figure 2:
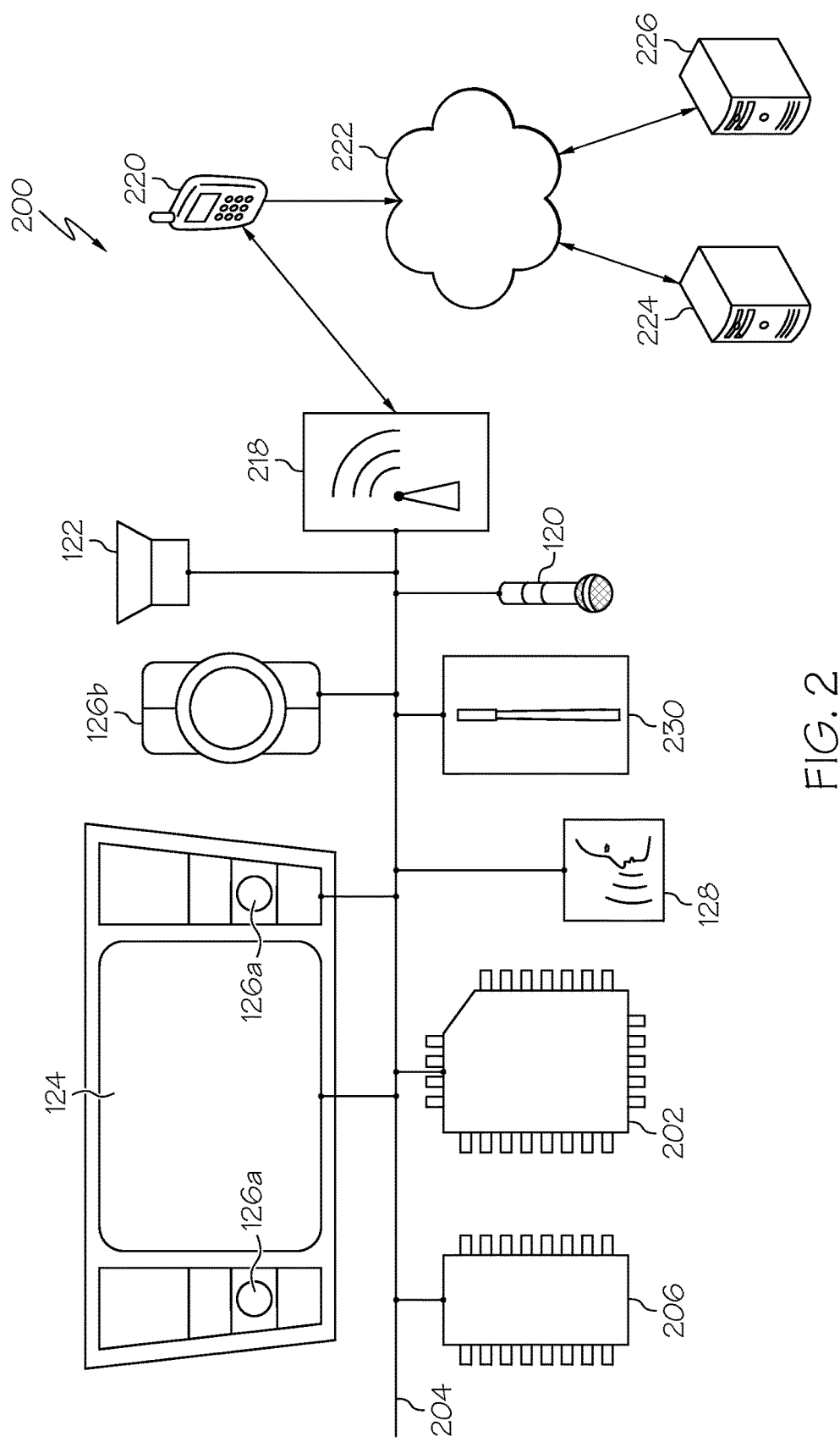
FIG. 2 schematically depicts a speech recognition system, according to one or more embodiments shown and described herein.

Referring now to FIG. 2, an embodiment of a speech recognition system 200, including a number of the components depicted in FIG. 1, is schematically depicted. It should be understood that the speech recognition system 200 may be integrated with the vehicle 102 or may be embedded within a mobile device (e.g., smartphone, laptop computer, etc.) carried by a driver of the vehicle.

The speech recognition system 200 includes one or more processors 202, a communication path 204, one or more memory modules 206, a display 124, a speaker 122, tactile input hardware 126a, a peripheral tactile input 126b, a microphone 120, an activation switch 128, network interface hardware 218, and a satellite antenna 230. The various components of the speech recognition system 200 and the interaction thereof will be described in detail below.

As noted above, the speech recognition system 200 includes the communication path 204. The communication path 204 may be formed from any medium that is capable of transmitting a signal such as, for example, conductive wires, conductive traces, optical waveguides, or the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 204 communicatively couples the various components of the speech recognition system 200. As used herein, the term "communicatively coupled" means that coupled components are capable of exchanging data signals with one another such as, for example, electrical signals via conductive medium, electromagnetic signals via air, optical signals via optical waveguides, and the like.

As noted above, the speech recognition system 200 includes the one or more processors 202. Each of the one or more processors 202 may be any device capable of executing machine readable instructions. Accordingly, each of the one or more processors 202 may be a controller, an integrated circuit, a microchip, a computer, or any other computing device. The one or more processors 202 are communicatively coupled to the other components of the speech recognition system 200 by the communication path 204. Accordingly, the communication path 204 may communicatively couple any number of processors with one another, and allow the modules coupled to the communication path 204 to operate in a distributed computing environment. Specifically, each of the modules may operate as a node that may send and/or receive data.

As noted above, the speech recognition system 200 includes the one or more memory modules 206. Each of the one or more memory modules 206 of the speech recognition system 200 is coupled to the communication path 204 and communicatively coupled to the one or more processors 202. The one or more memory modules 206 may comprise RAM, ROM, flash memories, hard drives, or any device capable of storing machine readable instructions such that the machine readable instructions can be accessed and executed by the one or more processors 202. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 206. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In some embodiments, the one or more memory modules 206 may include one or more speech recognition algorithms, such as an automatic speech recognition engine that processes speech input signals received from the microphone 120 and/or extracts speech information from such signals, as will be described in further detail below. Furthermore, the one or more memory modules 206 include machine readable instructions that, when executed by the one or more processors 202, cause the speech recognition to perform the actions described below.

Still referring to FIG. 2, as noted above, the speech recognition system 200 comprises the display 124 for providing visual output such as, for example, information, entertainment, maps, navigation, information, or a combination thereof. The display 124 is coupled to the communication path 204 and communicatively coupled to the one or more processors 202. Accordingly, the communication path 204 communicatively couples the display 124 to other modules of the speech recognition system 200. The display 124 may include any medium capable of transmitting an optical output such as, for example, a cathode ray tube, light emitting diodes, a liquid crystal display, a plasma display, or the like. Moreover, the display 124 may be a touchscreen that, in addition to providing optical information, detects the presence and location of a tactile input upon a surface of or adjacent to the display. Accordingly, each display may receive mechanical input directly upon the optical output provided by the display. Additionally, it is noted that the display 124 can include at least one of the one or more processors 202 and the one or memory modules 206. While the speech recognition system 200 includes a display 124 in the embodiment depicted in FIG. 2, the speech recognition system 200 may not include a display 124 in other embodiments, such as embodiments in which the speech recognition system 200 audibly provides outback or feedback via the speaker 122.

As noted above, the speech recognition system 200 comprises the speaker 122 for transforming data signals from the speech recognition system 200 into mechanical vibrations, such as in order to output audible prompts or audible information from the speech recognition system 200. The speaker 122 is coupled to the communication path 204 and communicatively coupled to the one or more processors 202. However, it should be understood that in other embodiments the speech recognition system 200 may not include the speaker 122, such as in embodiments in which the speech recognition system 200 does not output audible prompts or audible information, but instead visually provides output via the display 124.

Still referring to FIG. 2, as noted above, the speech recognition system 200 comprises tactile input hardware 126a coupled to the communication path 204 such that the communication path 204 communicatively couples the tactile input hardware 126a to other modules of the speech recognition system 200. The tactile input hardware 126a may be any device capable of transforming mechanical, optical, or electrical signals into a data signal capable of being transmitted with the communication path 204. Specifically, the tactile input hardware 126a may include any number of movable objects that each transform physical motion into a data signal that can be transmitted over the communication path 204 such as, for example, a button, a switch, a knob, a microphone or the like. In some embodiments, the display 124 and the tactile input hardware 126a are combined as a single module and operate as an audio head unit or an infotainment system. However, it is noted, that the display 124 and the tactile input hardware 126a may be separate from one another and operate as a single module by exchanging signals via the communication path 204. While the speech recognition system 200 includes tactile input hardware 126a in the embodiment depicted in FIG. 2, the speech recognition system 200 may not include tactile input hardware 126a in other embodiments, such as embodiments that do not include the display 124.

As noted above, the speech recognition system 200 optionally comprises the peripheral tactile input 126b coupled to the communication path 204 such that the communication path 204 communicatively couples the peripheral tactile input 126b to other modules of the speech recognition system 200. For example, in one embodiment, the peripheral tactile input 126b is located in a vehicle console to provide an additional location for receiving input. The peripheral tactile input 126b operates in a manner substantially similar to the tactile input hardware 126a, i.e., the peripheral tactile input 126b includes movable objects and transforms motion of the movable objects into a data signal that may be transmitted over the communication path 204.

As noted above, the speech recognition system 200 comprises the microphone 120 for transforming acoustic vibrations received by the microphone into a speech input signal. The microphone 120 is coupled to the communication path 204 and communicatively coupled to the one or more processors 202. As will be described in further detail below, the one or more processors 202 may process the speech input signals received from the microphone 120 and/or extract speech information from such signals.

Still referring to FIG. 2, as noted above, the speech recognition system 200 comprises the activation switch 128 for activating or interacting with the speech recognition system 200. In some embodiments, the activation switch 128 is an electrical switch that generates an activation signal when depressed, such as when the activation switch 128 is depressed by a user when the user desires to utilize or interact with the speech recognition system 200.

As noted above, the speech recognition system 200 includes the network interface hardware 218 for communicatively coupling the speech recognition system 200 with a mobile device 220 or a computer network. The network interface hardware 218 is coupled to the communication path 204 such that the communication path 204 communicatively couples the network interface hardware 218 to other modules of the speech recognition system 200. The network interface hardware 218 can be any device capable of transmitting and/or receiving data via a wireless network. Accordingly, the network interface hardware 218 can include a communication transceiver for sending and/or receiving data according to any wireless communication standard. For example, the network interface hardware 218 may include a chipset (e.g., antenna, processors, machine readable instructions, etc.) to communicate over wireless computer networks such as, for example, wireless fidelity (Wi-Fi), WiMax, Bluetooth, IrDA, Wireless USB, Z-Wave, ZigBee, or the like. In some embodiments, the network interface hardware 218 includes a Bluetooth transceiver that enables the speech recognition system 200 to exchange information with the mobile device 220 (e.g., a smartphone) via Bluetooth communication.

Still referring to FIG. 2, data from various applications running on the mobile device 220 may be provided from the mobile device 220 to the speech recognition system 200 via the network interface hardware 218. The mobile device 220 may be any device having hardware (e.g., chipsets, processors, memory, etc.) for communicatively coupling with the network interface hardware 218 and a cellular network 222. Specifically, the mobile device 220 may include an antenna for communicating over one or more of the wireless computer networks described above. Moreover, the mobile device 220 may include a mobile antenna for communicating with the cellular network 222. Accordingly, the mobile antenna may be configured to send and receive data according to a mobile telecommunication standard of any generation (e.g., 1G, 2G, 3G, 4G, 5G, etc.). Specific examples of the mobile device 220 include, but are not limited to, smart phones, tablet devices, e-readers, laptop computers, or the like.

The cellular network 222 generally includes a plurality of base stations that are configured to receive and transmit data according to mobile telecommunication standards. The base stations are further configured to receive and transmit data over wired systems such as public switched telephone network (PSTN) and backhaul networks. The cellular network 222 can further include any network accessible via the backhaul networks such as, for example, wide area networks, metropolitan area networks, the Internet, satellite networks, or the like. Thus, the base stations generally include one or more antennas, transceivers, and processors that execute machine readable instructions to exchange data over various wired and/or wireless networks.

Accordingly, the cellular network 222 can be utilized as a wireless access point by the mobile device 220 to access one or more servers (e.g., a first server 224 and/or a second server 226). The first server 224 and second server 226 generally include processors, memory, and chipset for delivering resources via the cellular network 222. Resources can include providing, for example, processing, storage, software, and information from the first server 224 and/or the second server 226 to the speech recognition system 200 via the cellular network 222. Additionally, it is noted that the first server 224 or the second server 226 can share resources with one another over the cellular network 222 such as, for example, via the wired portion of the network, the wireless portion of the network, or combinations thereof.

Still referring to FIG. 2, the one or more servers accessible by the speech recognition system 200 via the communication link of the mobile device 220 to the cellular network 222 may include third party servers that provide additional speech recognition capability. For example, the first server 224 and/or the second server 226 may include speech recognition algorithms capable of recognizing more words than the local speech recognition algorithms stored in the one or more memory modules 206. Furthermore, the first server 224 and/or the second server 226 may provide one or more grammars for use by the speech recognition system 200. It should be understood that the mobile device 220 may be communicatively coupled to any number of servers by way of the cellular network 222.

As noted above, the speech recognition system 200 optionally includes a satellite antenna 230 coupled to the communication path 204 such that the communication path 204 communicatively couples the satellite antenna 230 to other modules of the speech recognition system 200. The satellite antenna 230 is configured to receive signals from global positioning system satellites. Specifically, in one embodiment, the satellite antenna 230 includes one or more conductive elements that interact with electromagnetic signals transmitted by global positioning system satellites. The received signal is transformed into a data signal indicative of the location (e.g., latitude and longitude) of the satellite antenna 230 or an object positioned near the satellite antenna 230, by the one or more processors 202. Additionally, it is noted that the satellite antenna 230 may include at least one of the one or more processors 202 and the one or memory modules 206. In embodiments where the speech recognition system 200 is coupled to a vehicle, the one or more processors 202 execute machine readable instructions to transform the global positioning satellite signals received by the satellite antenna 230 into data indicative of the current location of the vehicle. While the speech recognition system 200 includes the satellite antenna 230 in the embodiment depicted in FIG. 2, the speech recognition system 200 may not include the satellite antenna 230 in other embodiments, such as embodiments in which the speech recognition system 200 does not utilize global positioning satellite information or embodiments in which the speech recognition system 200 obtains global positioning satellite information from the mobile device 220 via the network interface hardware 218.

Still referring to FIG. 2, it should be understood that the speech recognition system 200 can be formed from a plurality of modular units, i.e., the display 124, the speaker 122, tactile input hardware 126a, the peripheral tactile input 126b, the microphone 120, the activation switch 128, etc. can be formed as modules that when communicatively coupled form the speech recognition system 200. Accordingly, in some embodiments, each of the modules can include at least one of the one or more processors 202 and/or the one or more memory modules 206. Accordingly, it is noted that, while specific modules may be described herein as including a processor and/or a memory module, the embodiments described herein can be implemented with the processors and memory modules distributed throughout various communicatively coupled modules.

Figure 3:
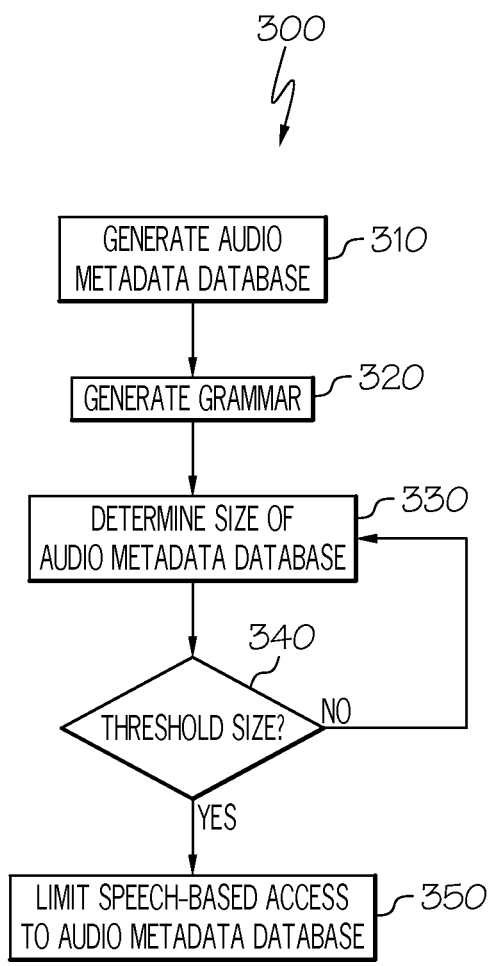
FIG. 3 schematically depicts a flowchart for limiting speech-based access to the audio metadata database, according to one or more embodiments shown and described herein.

FIG. 3 schematically depicts an exemplary flowchart 300 for limiting speech-based access to the audio metadata database 144a. Referring now to FIGS. 1-3, in block 310, the machine readable instructions stored in the one or more memory modules 206, when executed by the one or more processors 202, cause the speech recognition system 200 to populate the audio metadata database 144a. In some embodiments, the audio metadata database 144a may be populated by receiving and storing audio metadata information associated with a plurality of audio files from one or more audio sources. The audio sources may include, but are not limited to, the one or more memory modules 206, the mobile device 210, and any external device connected to the speech recognition system 200, such as a USB drive, a flash stick, a CD, a DVD, or the like. In some embodiments, when an audio source is connected to the speech recognition system 200, the speech recognition system 200 may automatically build the audio metadata database 144a by requesting or receiving metadata information associated with audio files stored on the audio source. In some embodiments, the speech recognition system 200 may only build the audio metadata database 144a in response to user input (e.g., user input provided via the tactile input hardware 126a, the peripheral tactile input 126b, a touchscreen of the display 124, or the like) received in response to a prompt output to the user via the display 124 or the speaker 122.

As noted above, the audio metadata database 144a includes a plurality of audio metadata entries. Each audio metadata entry includes metadata information associated with a corresponding audio file. By way of non-limiting example, the audio metadata database 144a may be a SQLite database including metadata information pertaining to a plurality of audio files indexed by the speech recognition systems described herein. In some embodiments, the audio metadata database 144a may include a plurality of tables, each of which corresponds to a different metadata category. The metadata categories may include song title, album name, artist, composer, playlist, genre, audiobook name, podcast title, or the like. For example, the audio metadata database 144a may include an artists table, an albums table, a songs table, a composers table, a genres table, or the like. Each table may include one or more audio metadata entries.

Each audio metadata entry may be associated with an audio file and may include a name appropriate for the category. For example, the artists table may include a number of audio metadata entries, each of which includes an artist name for the associated audio file. Likewise, the albums table may include a number of audio metadata entries, each of which includes an album name for the associated audio file. The songs table may include a number of audio metadata entries, each of which includes a song name for the associated audio file. The genres table may include a number of audio metadata entries, each of which includes a genre name for the associated audio file. Each audio metadata entry may include an audio source identifier associated with an audio source that includes the associated audio file, as will be described in further detail below. It should be understood that in other embodiments the audio metadata database may be structured differently than described herein or may include additional or less information than described herein. Furthermore, the audio metadata entries may include more or less information than described herein.

In some embodiments, the speech recognition system 200 may populate the audio metadata database 144a to include metadata associated with audio files stored on multiple devices connected to the speech recognition system 200 so that the speech recognition system 200 is able to access and play audio music files stored among a number of devices without selecting the particular device from which to play. For example, if a driver and a passenger enter the vehicle 102, each with a mobile device, it may be desirable to utilize the speech recognition system 200 to access content on both of the devices at the same time, rather than switching back and forth between the devices. Accordingly, in some embodiments in which multiple audio devices are connected to the speech recognition system 200, the speech recognition system 200 will be able to aggregate the audio content of the multiple devices by populating a shared audio metadata database 144a and preparing the associated grammars for the audio files stored on both devices. By way of a first non-limiting example of the usefulness of this feature, if a user says "Browse Michael Jackson's Albums," a list of the albums by Michael Jackson may be identified based on audio metadata entries of the audio metadata database 144a that include the artist name "Michael Jackson." In response to receiving such a request, the speech recognition system 200 may display on the display 124 a list of all albums associated with Michael Jackson, regardless of which device contains the music content. The user may then select an album to be played. By way of a second non-limiting example, if a user says "Play the song Summertime," in which the song "Summertime" by Kenny Chesney is on a first device and the song "Summertime" by Billie Holiday is on a second device, the song on each device may be identified based on audio metadata entries of the audio metadata database 144a that include the song name "Summertime." The speech recognition system 200 may display on the display 124 a list of the identified songs.

Still referring to FIGS. 1-3, the machine readable instructions stored in the one or more memory modules 206, when executed by the one or more processors 202, cause the speech recognition system 200 to generate a plurality of speech recognition grammars based on the audio metadata database 144a in block 320. The speech recognition grammars allow the speech recognition system 200 to map speech input received by the microphone 120 to a metadata name associated with one of the audio metadata entries in the audio metadata database 144a, which may in turn be used to search for or play a particular audio file.

Populating the audio metadata database 144a and/or generating the speech recognition grammars based on the audio metadata names, as described above, may require significant time and system resources, particularly in cases in which the audio metadata database 144a includes a large number of audio metadata entries, e.g., on the order of about 15,000. In some instances, it make take five to ten minutes to populate the audio metadata database 144a and/or generate the speech recognition grammars when the audio metadata database 144a includes about 10,000 to about 15,000 audio metadata entries. In some instances, when the size of the audio metadata database 144a is too large, speech-based access to audio content may be completely unavailable.

While the process of populating the audio metadata database 144a and generating the speech recognition grammars are described above with reference to blocks 310 and 320, it should be understood that in some embodiments the audio metadata database 144a and speech recognition grammars may already exist, such as when the audio metadata database 144a and the corresponding speech recognition grammars are retrieved from the one or more memory modules 206. In some embodiments, the audio metadata database 144a and associated speech recognition grammars may be stored in the one or more memory modules 206 when the vehicle 102 is turned off and may be restored from the one or more memory modules 206 when the vehicle 102 is turned on again (i.e., on future ignition cycles), thereby avoiding the time and delay of repopulating the audio metadata database 144a and associated speech recognition grammar. For example, the audio metadata database 144a and associated speech recognition grammars may be generated the first time a particular device is connected to the speech recognition system 200 of the vehicle 102, stored in the one or more memory modules 206 when the vehicle 102 is turned off, and may be restored from the one or more memory modules 206 when the vehicle 102 is turned on again, thereby avoiding the time and delay of repopulating the audio metadata database 144a and associated speech recognition grammar when the same device is connected.

Still referring to FIGS. 1-3, in block 330, the machine readable instructions stored in the one or more memory modules 206, when executed by the one or more processors 202, cause the speech recognition system 200 to determine a size of the audio metadata database 144a. In some embodiments, the speech recognition system 200 may determine a number of audio metadata entries in the audio metadata database 144a. In some embodiments, the speech recognition system 200 may determine a memory size of the audio metadata database 144a, such as by determining how much memory the audio metadata database 144a occupies. In other embodiments, the speech recognition system 200 may determine the size of the audio metadata database 144a in other ways, such as based on a number of speech recognition grammars associated with the audio metadata database 144a, based on an amount of memory that the associated speech recognition grammars occupy, based on a number of audio files accessible via the audio metadata database 144a, or the like.

Still referring to FIGS. 1-3, in block 340, the machine readable instructions stored in the one or more memory modules 206, when executed by the one or more processors 202, cause the speech recognition system 200 to determine whether the size of the audio metadata database 144a reaches a threshold size. In some embodiments that evaluate the size of the audio metadata database by determining the number of audio metadata entries in the audio metadata database 144a, the speech recognition system 200 may determine the size of the audio metadata database 144*a* reaches the threshold size when the number of audio metadata entries in the audio metadata database 144*a* reaches a threshold number. In some embodiments, the threshold number may be 15,000. However, it should be understood that in other embodiments the threshold number may be greater than or less than 15,000. In some embodiments that evaluate the size of the audio metadata database by determining a memory size of the audio metadata database 144*a*, the speech recognition system 200 may determine the size of the audio metadata database 144*a* reaches the threshold size when the memory size of the audio metadata database reaches a threshold memory size.

Still referring to FIGS. 1-3, if the size of the audio metadata database 144*a* is determined to reach the threshold size at block 340, the machine readable instructions stored in the one or more memory modules 206, when executed by the one or more processors 202, cause the speech recognition system 200 to limit which of the plurality of audio metadata entries may be accessed in response to a speech input signal in block 350. By limiting which of the plurality of audio metadata entries may be accessed in response to a speech input signal, at least some of the plurality of audio metadata entries will no longer be accessible via speech input, i.e., they will not be recognized by the speech recognition system 200 in response to received speech input. Speech recognition grammars associated with the no longer accessible audio metadata entries may not be required to be stored in memory or accessed when speech input is received for audio metadata entries that are no longer accessible via speech input. Such limitation of audio metadata entries may reduce memory requirements for the audio metadata database and/or the speech recognition grammars associated with the audio metadata entries that are no longer accessible, thereby enhancing system performance and reducing latency. Some embodiments may limit which of the plurality of audio metadata entries are speech accessible by employing one or more filters, preventing access by the speech recognition system 200 to one or more tables in the audio metadata database 144*a*, or the like.

1. Limiting Based On Metadata Category

In some embodiments, the speech recognition system 200 may limit which of the plurality of audio metadata entries may be accessed in response to a speech input signal based on a metadata category associated with at least one of the plurality of audio metadata entries. For example, the plurality of audio metadata entries in the audio metadata database 144*a* may include a category group of audio metadata entries associated with a metadata category (e.g., song name).

In order to limit the accessible audio metadata entries, in some embodiments, the speech recognition system 200 may remove at least one of the category group of audio metadata entries from the plurality of audio metadata entries that may be accessed by the speech recognition system 200, such that any removed audio metadata entries are no longer accessible for speech recognition, but other audio metadata entries associated with the metadata category are still accessible. In such embodiments, some audio metadata entries associated with audio files of the metadata category may still be accessible, but audio metadata entries of the category group that were removed from accessibility will no longer be accessible. By way of an example, if some song metadata entries are removed from accessibility, other song metadata entries may still be accessible.

In some embodiments, in order to order to limit the accessible audio metadata entries, the speech recognition system 200 may remove the entire category group of audio metadata entries from the plurality of audio metadata entries that may be accessed in response to the speech input signal, such that audio files associated with the metadata category are no longer accessible. However, in such embodiments, audio files associated with other metadata categories for which audio metadata entries exist in the audio metadata database 144*a* may still be accessible. For example, if all song metadata entries are no longer speech accessible, any audio metadata entries associated with albums, artists, genres, etc. may still be accessible. Limiting access to audio metadata entries associated with particular metadata categories may enhance system performance while still allowing substantial speech recognition functionality.

In some embodiments, the speech recognition system 200 may limit which of the plurality of audio metadata entries may be accessed in response to a speech input signal by eliminating audio metadata entries from access based on a first metadata category, followed by a second metadata category, and so on until the size of the audio metadata database is below a threshold size. For example, the speech recognition system 200 may first remove song metadata entries from the audio metadata entries that are speech accessible, followed by artist metadata entries, album metadata entries, and genre metadata entries until the size of the audio metadata database is below the threshold size. Other embodiments may limit the metadata categories that are speech accessible in other orders.

2. Limiting Based on Audio Source

In some embodiments, the speech recognition system 200 may limit which of the plurality of audio metadata entries may be accessed in response to a speech input signal based on an audio source associated with at least one of the plurality of audio metadata entries. For example, the plurality of audio metadata entries in the audio metadata database 144*a* may include an audio source group of audio metadata entries associated with an audio source (e.g., an iPod).

In order to limit the accessible audio metadata entries, in some embodiments, the speech recognition system 200 may remove at least one of the audio source group of audio metadata entries, such that any removed audio metadata entries are no longer accessible for speech recognition, but other audio metadata entries associated with the audio source are still accessible. In such embodiments, some audio metadata entries associated with audio files of the audio source may still be accessible, but audio metadata entries of the audio source group that were removed from accessibility will no longer be accessible.

In some embodiments, in order to order to limit the accessible audio metadata entries, the speech recognition system 200 may remove the entire audio source group of audio metadata entries from the plurality of audio metadata entries that may be accessed in response to the speech input signal, such that audio files associated with the audio source are no longer accessible. However, in such embodiments, audio files associated with other audio sources for which audio metadata entries exist in the audio metadata database 144*a* may still be accessible. For example, if all audio metadata entries associated with an iPod are no longer speech accessible, any audio metadata entries associated with another flash drive or USB drive may still be accessible. In this case, audio files on the iPod will not be speech accessible, but audio files on the flash drive or USB device will remain speech accessible. Limiting access to audio metadata entries associated with particular devices may enhance system performance while still allowing substantial speech recognition functionality.

If the speech recognition system 200 determines that the size of the audio metadata database 144a has not reached the threshold size in block 340, the machine readable instructions stored in the one or more memory modules 206, when executed by the one or more processors 202, cause the speech recognition system 200 to return to block 330 to determine the size of the audio metadata database 144a again.

In some embodiments, the speech recognition system 200 may remove a previously imposed limitation of which of the plurality of audio metadata entries are speech accessible based on a context of the speech recognition system 200. For example, if the speech recognition system 200 limited the audio metadata entries that may be accessed in response to a speech input signal to exclude, for example, song names, the speech recognition system 200 may restore accessibility of the song names if the system context indicated that a song was to be played (e.g., if "play a song" were received as speech input). It should be understood that the speech recognition system 200 may remove other limitations of which of the plurality of audio metadata entries are speech accessible based on other particular contexts.

It should be understood that embodiments described herein provide for systems, vehicles, and methods for limiting speech-based access to an audio metadata database. Embodiments described herein determine when a size of an audio metadata database reaches a threshold size and limit which of a plurality of audio metadata entries may be accessed in response to a speech input signal when the size of the audio metadata database reaches the threshold size. Such limitation of accessible audio metadata entries may reduce memory requirements for the audio metadata database and/or the speech recognition grammars associated with the audio metadata entries that are no longer accessible, thereby enhancing system performance and reducing latency.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A speech recognition system comprising:
   one or more processors;
   a microphone communicatively coupled to the one or more processors, wherein the microphone receives acoustic vibrations;
   one or more memory modules communicatively coupled to the one or more processors;
   an audio metadata database stored in the one or more memory modules, wherein the audio metadata database includes a plurality of audio metadata entries, wherein each audio metadata entry includes metadata information associated with at least one audio file, wherein the plurality of audio metadata entries includes a first audio metadata entry associated with a first audio file; and
   machine readable instructions stored in the one or more memory modules that cause the speech recognition system to perform at least the following when executed by the one or more processors:
      transform the acoustic vibrations received by the microphone into a speech input signal;
      determine a size of the audio metadata database;
      allow speech-based access to the first audio metadata entry in response to the speech input signal when the size of the audio metadata database is less than a threshold size; and
      remove speech-based access to the first audio metadata entry in response to the speech input signal when the size of the audio metadata database reaches the threshold size,
   wherein:
   the plurality of audio metadata entries includes a first group of audio metadata entries and a second group of audio metadata entries;
   the first group of audio metadata entries is associated with a first group of audio files that are associated with a first audio source device;
   the second group of audio metadata entries is associated with a second group of audio files that are associated with a second audio source device; and
   the machine readable instructions stored in the one or more memory modules cause the speech recognition system to perform at least the following when executed by the one or more processors:
      allow speech-based access to the first group of audio metadata entries associated with the first group of audio files that are associated with the first audio source device when the size of the audio metadata database is less than the threshold size;
      allow speech-based access to the second group of audio metadata entries associated with the second group of audio files that are associated with the second audio source device when the size of the audio metadata database is less than the threshold size;
      allow speech-based access to the first group of audio metadata entries associated with the first group of audio files that are associated with the first audio source device when the size of the audio metadata database reaches the threshold size; and
      remove speech-based access to the second group of audio metadata entries associated with the second group of audio files that are associated with the second audio source device when the size of the audio metadata database reaches the threshold size.

2. The speech recognition system of claim 1, wherein the machine readable instructions stored in the one or more memory modules cause the speech recognition system to perform at least the following when executed by the one or more processors:
   determine a number of audio metadata entries in the audio metadata database; and
   determine the size of the audio metadata database reaches the threshold size when the number of audio metadata entries in the audio metadata database reaches a threshold number.

3. The speech recognition system of claim 1, wherein the machine readable instructions stored in the one or more memory modules cause the speech recognition system to perform at least the following when executed by the one or more processors:
   determine a memory size of the audio metadata database; and
   determine the size of the audio metadata database reaches the threshold size when the memory size of the audio metadata database reaches a threshold memory size.

4. The speech recognition system of claim 1, wherein:
the plurality of audio metadata entries includes a first category group of audio metadata entries and a second category group of audio metadata entries;
the first category group of audio metadata entries are associated with a first metadata category;
the second category group of audio metadata entries are associated with a second metadata category different from the first metadata category; and
the machine readable instructions stored in the one or more memory modules cause the speech recognition system to perform at least the following when executed by the one or more processors:
  allow speech-based access to the first category group of audio metadata entries associated with the first metadata category when the size of the audio metadata database is less than the threshold size;
  allow speech-based access to the second category group of audio metadata entries associated with the second metadata category when the size of the audio metadata database is less than the threshold size;
  allow speech-based access to the first category group of audio metadata entries associated with the first metadata category when the size of the audio metadata database reaches the threshold size; and
  remove speech-based access to the second category group of audio metadata entries associated with the second metadata category when the size of the audio metadata database reaches the threshold size.

5. The speech recognition system of claim 1, wherein the plurality of audio metadata entries includes a category group of audio metadata entries, wherein the category group of audio metadata entries are associated with a metadata category, wherein the machine readable instructions stored in the one or more memory modules cause the speech recognition system to perform at least the following when executed by the one or more processors:
  remove the category group of audio metadata entries from the plurality of audio metadata entries that may be accessed in response to the speech input signal when the size of the audio metadata database reaches the threshold size.

6. The speech recognition system of claim 1, wherein the machine readable instructions stored in the one or more memory modules cause the speech recognition system to perform at least the following when executed by the one or more processors:
  limit which of the plurality of audio metadata entries may be accessed in response to the speech input signal based on an audio source associated with at least one of the plurality of audio metadata entries when the size of the audio metadata database reaches the threshold size.

7. The speech recognition system of claim 6, wherein the plurality of audio metadata entries includes an audio source group of audio metadata entries, wherein the audio source group of audio metadata entries are associated with an audio source, wherein the machine readable instructions stored in the one or more memory modules cause the speech recognition system to perform at least the following when executed by the one or more processors:
  remove at least one of the audio source group of audio metadata entries from the plurality of audio metadata entries that may be accessed in response to the speech input signal when the size of the audio metadata database reaches the threshold size.

8. The speech recognition system of claim 6, wherein the plurality of audio metadata entries includes an audio source group of audio metadata entries, wherein the audio source group of audio metadata entries are associated with an audio source, wherein the machine readable instructions stored in the one or more memory modules cause the speech recognition system to perform at least the following when executed by the one or more processors:
  remove the audio source group of audio metadata entries from the plurality of audio metadata entries that may be accessed in response to the speech input signal when the size of the audio metadata database reaches the threshold size.

9. The speech recognition system of claim 1, wherein the metadata information includes a song title, an album name, an artist, a composer, a playlist, a genre, an audiobook name, or a podcast title.

10. The speech recognition system of claim 1, wherein the machine readable instructions stored in the one or more memory modules cause the speech recognition system to perform at least the following when executed by the one or more processors:
  remove a speech recognition grammar associated with the first audio metadata entry from memory in response to removing speech-based access to the first audio metadata entry when the size of the audio metadata database reaches the threshold size.

11. A vehicle comprising:
one or more processors;
a microphone communicatively coupled to the one or more processors, wherein the microphone receives acoustic vibrations;
one or more memory modules communicatively coupled to the one or more processors;
an audio metadata database stored in the one or more memory modules, wherein the audio metadata database includes a plurality of audio metadata entries, wherein each audio metadata entry includes metadata information associated with at least one audio file, wherein the plurality of audio metadata entries includes a first audio metadata entry associated with a first audio file; and
machine readable instructions stored in the one or more memory modules that cause the vehicle to perform at least the following when executed by the one or more processors:
  transform the acoustic vibrations received by the microphone into a speech input signal;
  determine a size of the audio metadata database;
  allow speech-based access to the first audio metadata entry in response to the speech input signal when the size of the audio metadata database is less than a threshold size; and
  remove speech-based access to the first audio metadata entry in response to the speech input signal when the size of the audio metadata database reaches the threshold size,
wherein:
the plurality of audio metadata entries includes a first group of audio metadata entries and a second group of audio metadata entries;
the first group of audio metadata entries is associated with a first group of audio files that are associated with a first audio source device;
the second group of audio metadata entries is associated with a second group of audio files that are associated with a second audio source device; and the machine readable instructions stored in the one or more memory modules cause the vehicle to perform at least the following when executed by the one or more processors:
- allow speech-based access to the first group of audio metadata entries associated with the first group of audio files that are associated with the first audio source device when the size of the audio metadata database is less than the threshold size;
- allow speech-based access to the second group of audio metadata entries associated with the second group of audio files that are associated with the second audio source device when the size of the audio metadata database is less than the threshold size;
- allow speech-based access to the first group of audio metadata entries associated with the first group of audio files that are associated with the first audio source device when the size of the audio metadata database reaches the threshold size; and
- remove speech-based access to the second group of audio metadata entries associated with the second group of audio files that are associated with the second audio source device when the size of the audio metadata database reaches the threshold size.

12. The vehicle of claim 11, wherein the machine readable instructions stored in the one or more memory modules cause the vehicle to perform at least the following when executed by the one or more processors:
- determine a number of audio metadata entries in the audio metadata database; and
- determine the size of the audio metadata database reaches the threshold size when the number of audio metadata entries in the audio metadata database reaches a threshold number.

13. The vehicle of claim 11, wherein the machine readable instructions stored in the one or more memory modules cause the vehicle to perform at least the following when executed by the one or more processors:
- limit which of the plurality of audio metadata entries may be accessed in response to the speech input signal based on a metadata category associated with at least one of the plurality of audio metadata entries when the size of the audio metadata database reaches the threshold size.

14. The vehicle of claim 11, wherein the machine readable instructions stored in the one or more memory modules cause the vehicle to perform at least the following when executed by the one or more processors:
- limit which of the plurality of audio metadata entries may be accessed in response to the speech input signal based on an audio source associated with at least one of the plurality of audio metadata entries when the size of the audio metadata database reaches the threshold size.

15. The vehicle of claim 11, wherein the machine readable instructions stored in the one or more memory modules cause the vehicle to perform at least the following when executed by the one or more processors:
- store the audio metadata database in the one or more memory modules before the vehicle is powered off; and
- access the audio metadata database from the one or more memory modules when the vehicle is turned on.

16. The vehicle of claim 11, wherein the machine readable instructions stored in the one or more memory modules cause the vehicle to perform at least the following when executed by the one or more processors:
- remove a speech recognition grammar associated with the first audio metadata entry from memory in response to removing speech-based access to the first audio metadata entry when the size of the audio metadata database reaches the threshold size.

17. A method for limiting access to an audio metadata database stored in one or more memory modules, wherein the audio metadata database includes a plurality of audio metadata entries, wherein each audio metadata entry includes metadata information associated with at least one audio file, wherein the plurality of audio metadata entries includes a first audio metadata entry associated with a first audio file, the method comprising:
- receiving, automatically by a processor a speech input signal;
- determining a size of the audio metadata database;
- allowing speech-based access to the first audio metadata entry in response to the speech input signal when the size of the audio metadata database is less than a threshold size; and
- removing speech-based access to the first audio metadata entry in response to the speech input signal when the size of the audio metadata database reaches the threshold size,
- wherein the plurality of audio metadata entries includes a first group of audio metadata entries and a second group of audio metadata entries, the first group of audio metadata entries is associated with a first group of audio files that are associated with a first audio source device, and the second group of audio metadata entries is associated with a second group of audio files that are associated with a second audio source device, the method further comprising:
- allowing speech-based access to the first group of audio metadata entries associated with the first group of audio files that are associated with the first audio source device when the size of the audio metadata database is less than the threshold size;
- allowing speech-based access to the second group of audio metadata entries associated with the second group of audio files that are associated with the second audio source device when the size of the audio metadata database is less than the threshold size;
- allowing speech-based access to the first group of audio metadata entries associated with the first group of audio files that are associated with the first audio source device when the size of the audio metadata database reaches the threshold size; and
- removing speech-based access to the second group of audio metadata entries associated with the second group of audio files that are associated with the second audio source device when the size of the audio metadata database reaches the threshold size.

18. The method of claim 17, further comprising:
- determining a number of audio metadata entries in the audio metadata database; and
- determining the size of the audio metadata database reaches the threshold size when the number of audio metadata entries in the audio metadata database reaches a threshold number.

19. The method of claim 17, further comprising:
- limiting which of the plurality of audio metadata entries may be accessed in response to the speech input signal based on a metadata category associated with at least one of the plurality of audio metadata entries when the size of the audio metadata database reaches the threshold size.

20. The method of claim 17, further comprising:
limiting which of the plurality of audio metadata entries may be accessed in response to the speech input signal based on an audio source associated with at least one of the plurality of audio metadata entries when the size of the audio metadata database reaches the threshold size.

21. The method of claim 17, wherein the metadata information includes a song title, an album name, an artist, a composer, a playlist, a genre, an audiobook name, or a podcast title.

22. The method of claim 17, further comprising:
removing a speech recognition grammar associated with the first audio metadata entry from memory in response to removing speech-based access to the first audio metadata entry when the size of the audio metadata database reaches the threshold size.

* * * * *